United States Patent
Schryer et al.

(10) Patent No.: US 7,957,302 B2
(45) Date of Patent: Jun. 7, 2011

(54) IDENTIFYING ANALOG ACCESS LINE IMPAIRMENTS USING DIGITAL MEASUREMENTS

(75) Inventors: Norm L. Schryer, New Providence, NJ (US); Thomas Killian, Westfield, NJ (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 70 days.

(21) Appl. No.: 12/334,033

(22) Filed: Dec. 12, 2008

(65) Prior Publication Data
US 2010/0149998 A1   Jun. 17, 2010

(51) Int. Cl.
*H04L 1/00* (2006.01)
(52) U.S. Cl. .................................................. 370/248
(58) Field of Classification Search .................. None
See application file for complete search history.

(56) References Cited

U.S. PATENT DOCUMENTS

| | | | |
|---|---|---|---|
| 5,915,417 A * | 6/1999 | Diaz et al. ................. | 137/624.11 |
| 6,807,156 B1 | 10/2004 | Veres et al. | |
| 2008/0025226 A1 * | 1/2008 | Mogul et al. .................. | 370/242 |
| 2008/0091819 A1 * | 4/2008 | Yang .............................. | 709/224 |
| 2008/0291839 A1 * | 11/2008 | Hooper et al. ................. | 370/248 |

* cited by examiner

*Primary Examiner* — Jianye Wu
(74) *Attorney, Agent, or Firm* — Hoffmann & Baron, LLP (57) ABSTRACT

The preferred embodiments include a method, system or computer-readable storage medium for identifying analog access line impairments in a communications network. The embodiments include determining a ping packet loss count and a ping failure count from digital packet loss data associated with at least one analog access line. The embodiments also include generating a line designation for the at least one analog access line in response to the ping packet loss count exceeding a first threshold and the ping failure count exceeding a second threshold. Also, a plurality of pings can be transmitted during a testing period, the digital packet loss data being generated in response to the plurality of pings. The first threshold can represent at least a three percent ping packet loss. The second threshold can represent the ping failure count being at least ten percent of a total number of the plurality of pings.

14 Claims, 6 Drawing Sheets

IDENTIFYING ANALOG ACCESS LINE IMPAIRMENTS USING DIGITAL MEASUREMENTS

TECHNICAL FIELD

The present disclosed technologies relate to analyzing and identifying line impairments in an analog line of a communications network using digital measurements.

BACKGROUND

Analog access lines in communications networks often suffer from impairments such as attenuation, near-end-crosstalk, far-end-crosstalk, impulse noise, electromagnetic interference, poor connections due to oxidation and a condition commonly referred to as "water-on-the-line." Examples of such analog access lines include cable, DSL, VDSL, wireless and even optical fiber all carry digital data over analog signals. The large majority of contemporary communication systems use analog transmission. A good many of these impairments are intermittent, present one minute and gone the next, making them difficult to verify and/or diagnose. Nonetheless, even intermittent problems with service can create unhappy customers.

Currently, diagnosis or repair of water-on-the-line or other intermittent conditions are only addressed by access providers in response to customer complaints. This requires sending a technicians with their equipment (truck rolls) to the site to diagnose and hopefully repair the problem. Such techniques are expensive and only identify the problem after a customer has made the effort to complain. Some dissatisfied customers, rather than complain, look for an alternative service provider.

There is therefore a need for a method, system and/or medium for identifying analog access line impairments, which is inexpensive and can be run proactively in order to further customer satisfaction. Such a method, system and/or medium preferably can be executed remotely and avoids dispatching truck rolls to initially diagnose the problem.

SUMMARY

The preferred embodiments of the present disclosed technology include a method, medium, and system for identifying analog access line impairments in a communications network. The identification includes determining a ping packet loss count and a ping failure count from digital packet loss data associated with at least one analog access line. Then also generating a line designation for the at least one analog access line in response to the ping packet loss count exceeding a first threshold and the ping failure count exceeding a second threshold. Further a plurality of pings can be transmitted during a testing period on the analog access line, the digital packet loss data being generated in response to the plurality of pings. The plurality of pings can include at least 200 pings. Transmitting the plurality of pings can be repeated a plurality of times per day. Transmitting the plurality of pings can be repeated no more than six times per day. The first threshold can represent at least a three percent ping packet loss. The second threshold can represent the ping failure count is at least ten percent of a total number of the plurality of pings during a test period.

Other objects and features will become apparent from the following detailed description considered in conjunction with the accompanying drawings. Some embodiments are illustrated by way of example, but it is to be understood that the drawings are designed as an illustration only and not as a definition of the limits of the invention.

DETAILED DESCRIPTION OF THE PREFERRED EMBODIMENTS

Figure 1:
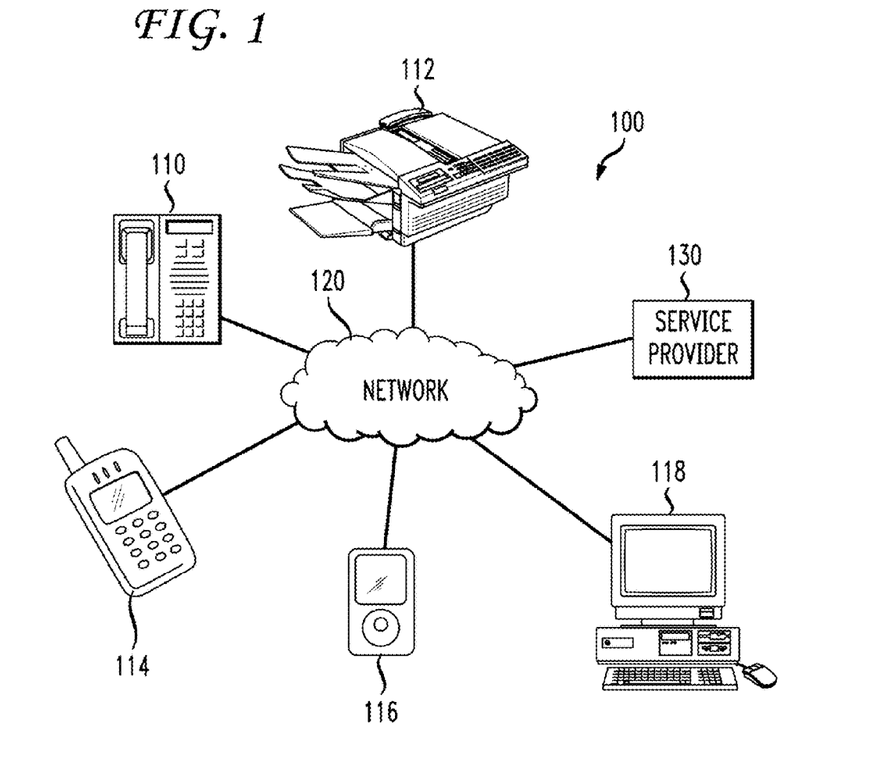
FIG. 1 is a schematic representation of a system for identifying access line impairments in a communications network in accordance with a preferred embodiments of the present disclosed technology.

FIG. 1 is a block diagram of a system 100 for diagnosing and/or identifying analog line impairments in a communications network 120 (hereinafter "network 120") in accordance with the preferred embodiments of the present disclosed technology. The system 100 can include customers (also referred to as users) that access a network 120, which is a broadband network. The customers access the network 120 through various electronic means, such as through VOIP telephones 110, facsimile machines 112, cell phones or wireless communication devices 114, other electronic devices 116, computers 118 (also referred to as a computing device or personal computing device) and other electronic devices. The access by customers to the network 120 is generally through analog access lines include cable, DSL, VDSL, wireless and even optical fiber all carry digital data over analog signals. The signal-to-noise ratio of the analog channel is important, determining the basic bit-rate/second. For example, even for FTTH, a tightly bent optical fiber loses much of its signal strength, resulting in degraded signal-to-noise levels and hence noise and loss. Additionally, the service provider 130 (typically a broadband service provider), is coupled to the network 120. Preferably, the service provider 130 uses modems such as cable or (V)DSL modems and fiber-to-the-home residential gateways, such as Verizon Fios® optical network terminals. Additionally, the service provider 130 preferably has its own network elements including (V)DSLAMs for (V)DSL Networks, fiber-nodes for cable operators, Cable CMTS, (V)DSL routers, Verizon Fios® optical line terminals, and routers and servers with internet connections, such as OC-X optical links.

Figure 2:
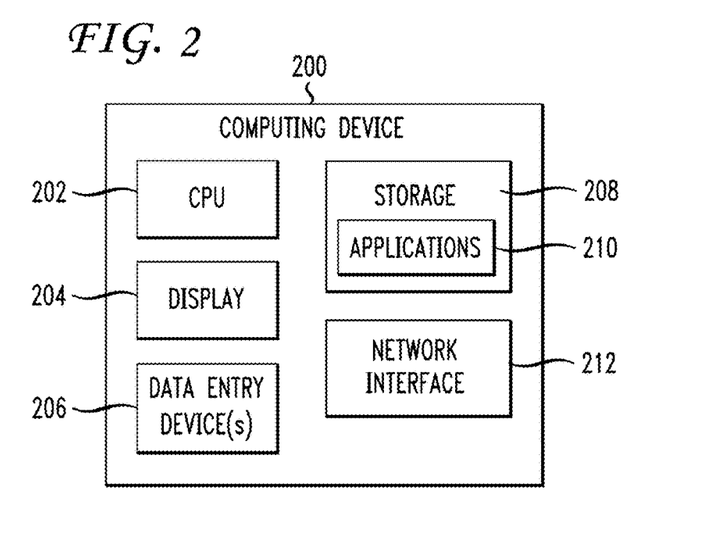
FIG. 2 is a block diagram of a computing device for performing the analysis of the access line impairments.

FIG. 2 is a block diagram of a computing device for performing the analysis of the access line impairments. The preferred embodiments of the present system can include a sampling and/or analysis unit for testing analog line impairments. Preferably, the hardware elements include a computing device 200, such as a server or servers(s) with a network interface 212, such as a connection to the Internet. A server receives from the service provider a list of pingable IP addresses it wishes to assess for digital impairment. Every few, e.g., 4 hours, the server may issue a ping probe that consists of a number of pings (for example 200) to each of the IP addresses. A record is made of the minimum, maximum and average delay, loss and xmt/rcv/loss % for each IP address, along with a time-stamp. The ping probe is preferably small enough to work quickly and large enough to assess loss to ½%. More or less than 200 pings/probe can be used, trading speed for accuracy as needed. A single 1 GHZ processor server is generally capable of pinging 100 k IP addresses every 4 hours.

The network interface 212 is preferably capable of handling the bits/sec. generated by the ping probes. A typical 64 Byte ping packet, done 200 times, at one second each, uses 512 bits/sec per IP address. To complete probes in 4 hours for 100 k IP addresses, 50 threads each pinging 2,000 IP addresses can be performed. Also, preferably a multi-threaded processor/server is provided to accomplish this end. Thus, the load on the Internet links should be approximately 50*64*8 bits/sec.=25,600 bits/sec., if the ping threads are done in sequence. To speed-up the process, N>1 ping per thread may be performed, with the resulting speed of N*25,600 bits/sec. Preferably, the load is kept well under the Internet link speed in order to ensure things work properly. The system generally generates a sizeable amount of data. For example, for 100 k IP addresses and 200 ping/probe, 100 k records of length roughly 100 bytes, or 10 MB per probe. This can preferably be compressed to approximately 2 MB/probe. Performing this operation 6 times/day, translates to 16 MB/day, 112 MB/week, 500 MB/month, 6 GB/year. More frequent probes will yield more data/day.

An example of such a computing device 200 includes, but should not be limited to a typical personal computer (PC) configuration with a CPU 202, such as an Intel Pentium class processor. Preferably the CPU 202 performs at a clock speed of 3 GHz. Also, the computing device 200 preferably includes data storage 208 for applications 210 and other elements. For example, the device 200 preferably has 2 gigabytes of main memory, 250 gigabytes of file system storage and a 1000baseT Ethernet interface. Such a system can have a display 204 and user data entry device 206. However, a display 204 and/or data entry device 206 may be optional. For example where the device 200 has means by which it can be accessed and controlled remotely, as would be the case if it runs a Secure Shell (ssh) login service, or the like. Such a system may have a plurality of network interfaces 212, one of which may, for security reasons, be dedicated exclusively to remote access and control. Such a system is preferably able to send and receive Internet Control Message Protocol (ICMP) messages, including ICMP Echo Requests (also known as pings) and ICMP Echo Replies, or at least, to send and receive network packets, such as User Datagram Packets (UDP), that can elicit responding packets from the systems or devices that are connected to the lines under test.

Figure 3:
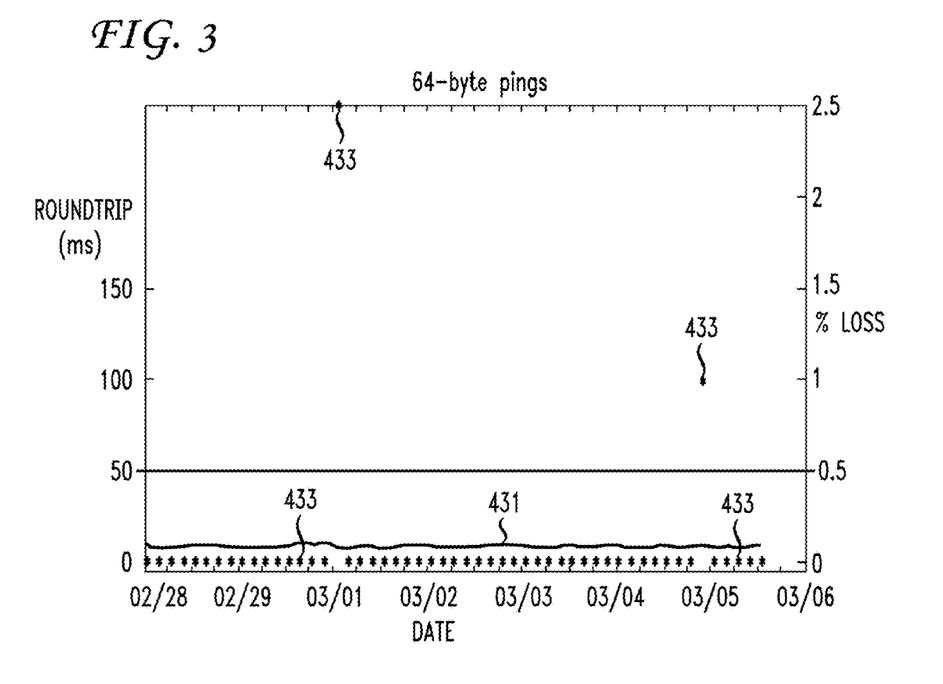
FIG. 3 is a graphical representation of packet loss measurements in accordance with a preferred process as described further herein, showing relatively few or no problems in a line.

FIG. 3 is a graphical representation of packet loss measurements in accordance with a preferred process as described further herein, showing relatively few or no problems in a line. The delay 431 (also known as latency) in receiving responses is represented in milliseconds (ms). The packet losses 433 (shown as asterisks) are represented as a percent-age for an Internet feed. It should be understood that the graphs in FIGS. 3-7 represent any packet loss values at or above 2.5% as an asterisk at the 2.5% level on the graph. The graph as shown in FIG. 3 generally represents favorable conditions on a line. The delay 431 is roughly constant and the total number of losses 433 is relatively low for 2/42 probes, or 7/42*200 pings done over a week, at 6 probes/day/IP address.

Figure 4:
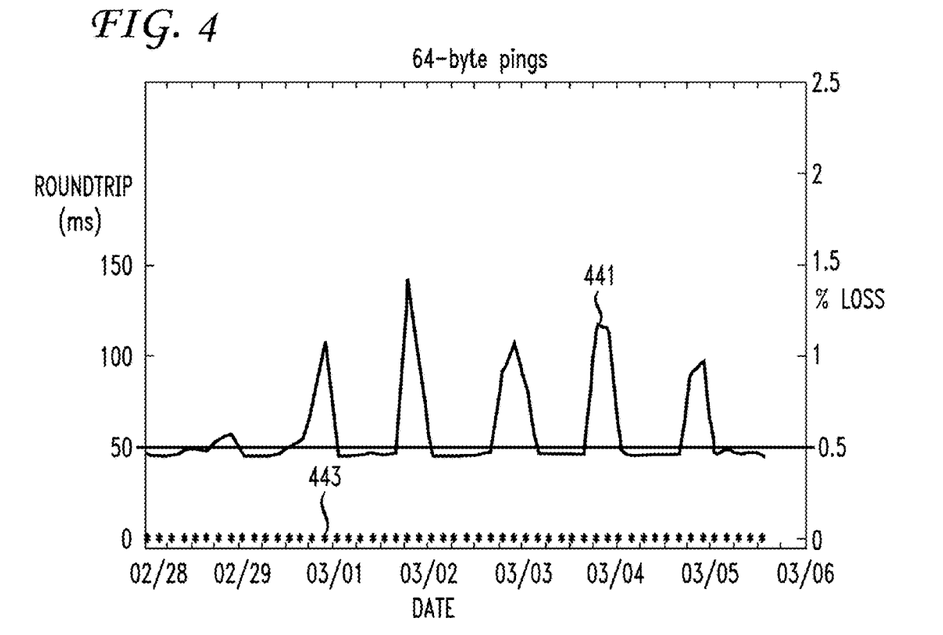
FIG. 4 is a graphical representation of packet loss measurements in accordance with a preferred process as described further herein, showing a latency rise in a line.

FIG. 4 is a graphical representation of packet loss measurements showing a slightly oversold DSLAM or fiber-node. At roughly the same busy-hour every day, the delay 441 rises by a factor of 2-3, but there is little or no loss 443. This means the Broadband service provider has sold the service to more subscribers than the fiber-node or DSLAM can support, which is referred to as being oversold. If each subscriber uses approximately 200 kb/s on average and there are roughly 500 subscribers on the fiber-node, then if all the subscribers use the line at once, the backhaul has to handle 100 Mb/s of data. If the provisioned backhaul is a T3/DS3 line of 45 MB/s, that translates to an oversold line by nearly a factor of 2 at the busy hour(s). Also, it should be understood that as load rises, so does delay.

Figure 5:
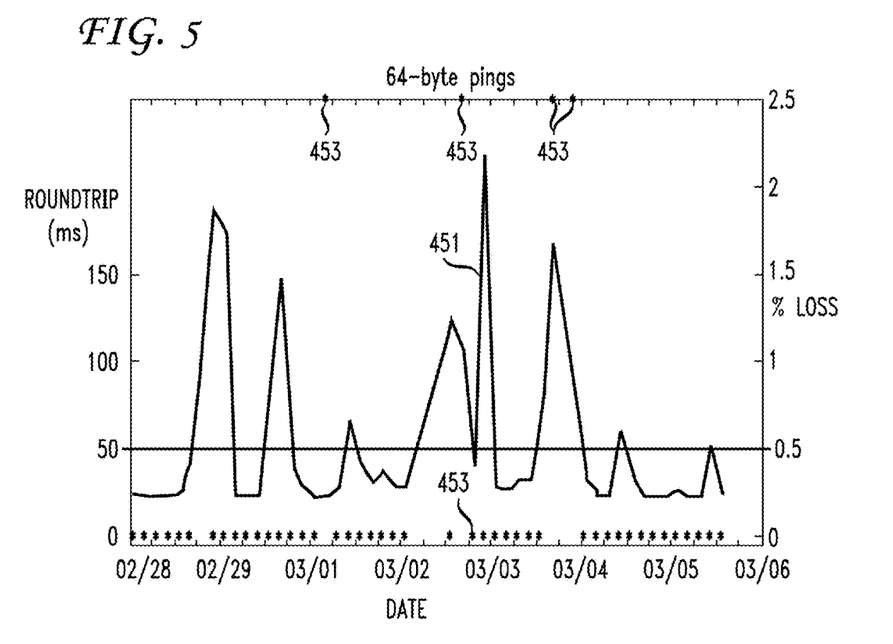
FIG. 5 is a graphical representation of packet loss measurements in accordance with a preferred process as described further herein, showing large latency peaks in a line.

FIG. 5 is a graphical representation of packet loss measurements showing a badly overloaded Internet feed. In this example, the user requested bits/sec. are much greater than the feed can support. This causes very wide delay 451 swings and notable loss 453. A simple queuing theory model helps explain this behavior. A queue in a router, server or PC, of length N can handle a load that maintains the queue length to less than or equal to N(<=N). As the queue length grows, the delay grows because the queue length gets multiplied by the time to transmit a packet. As packets backup in the queue, the delay grows. If there are too many packets in the queue and a new packet arrives, then the new packet is lost. Thus, we expect delay 451 to grow with oversold backhaul, and be capped by loss 453 as the queue length is exceeded. This graphical representation is referred to as a "volcano" because each delay 451 peak is generally associated with an asterisk above it representing the loss 453 associated with each peak.

Figure 6:
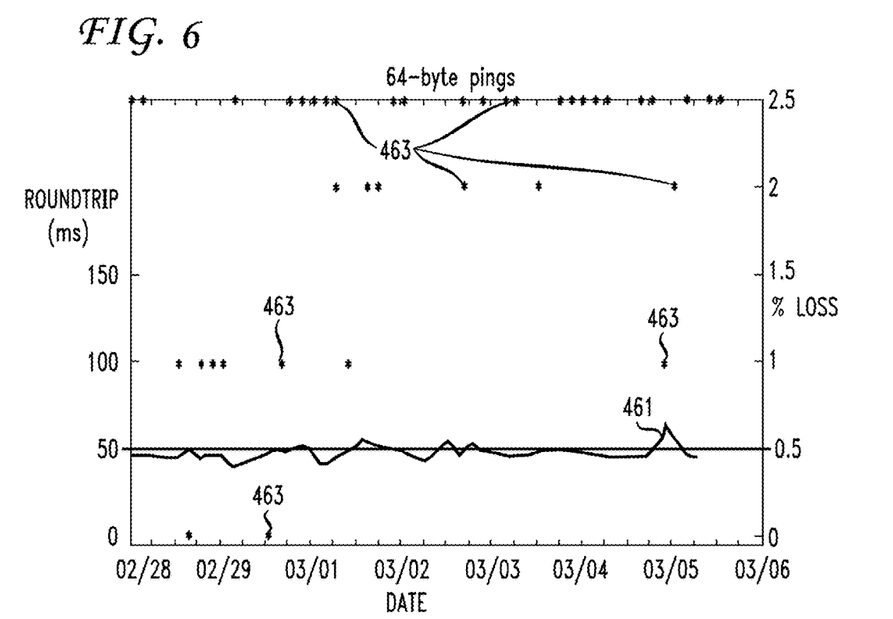
FIG. 6 is a graphical representation of packet loss measurements in accordance with a preferred process as described further herein, showing a mild latency with significant packet loss in a line.
Figure 7:
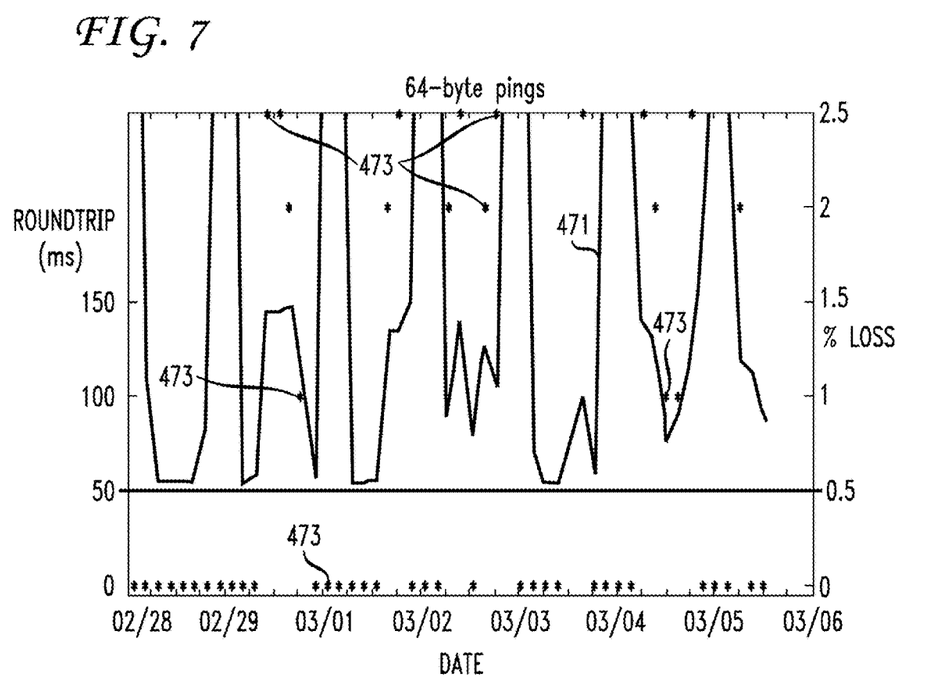
FIG. 7 is a graphical representation of packet loss measurements in accordance with a preferred process as described further herein, showing large latency and significant packet loss in a line.

FIG. 6 is a graphical representation of packet loss measurements showing an "RF" afflicted user. The delay 461 is not correlated with loss 463, as in the "volcano" above. Instead loss 463 is "randomly" scattered all over the plot, and in this case the delay 461 remains fairly steady. The "RF" refers to radio frequency (analog) noise, which can be caused by anything from water-on-the-line in a cable or DSL tightly bent optical fiber. FIG. 7 represents a user access line suffering from an oversold feed condition at the same time as an "RF" problem, with the delay 471 and losses 473 corresponding to a mix of those conditions. This condition generally results in a very unhappy user/customer. It should be understood that such a graph is generally interpreted as "oversold" through the latency 461. The techniques used herein generally take advantage of loss statistics generated by actual or likely signal-to-noise problems.

Figure 8:
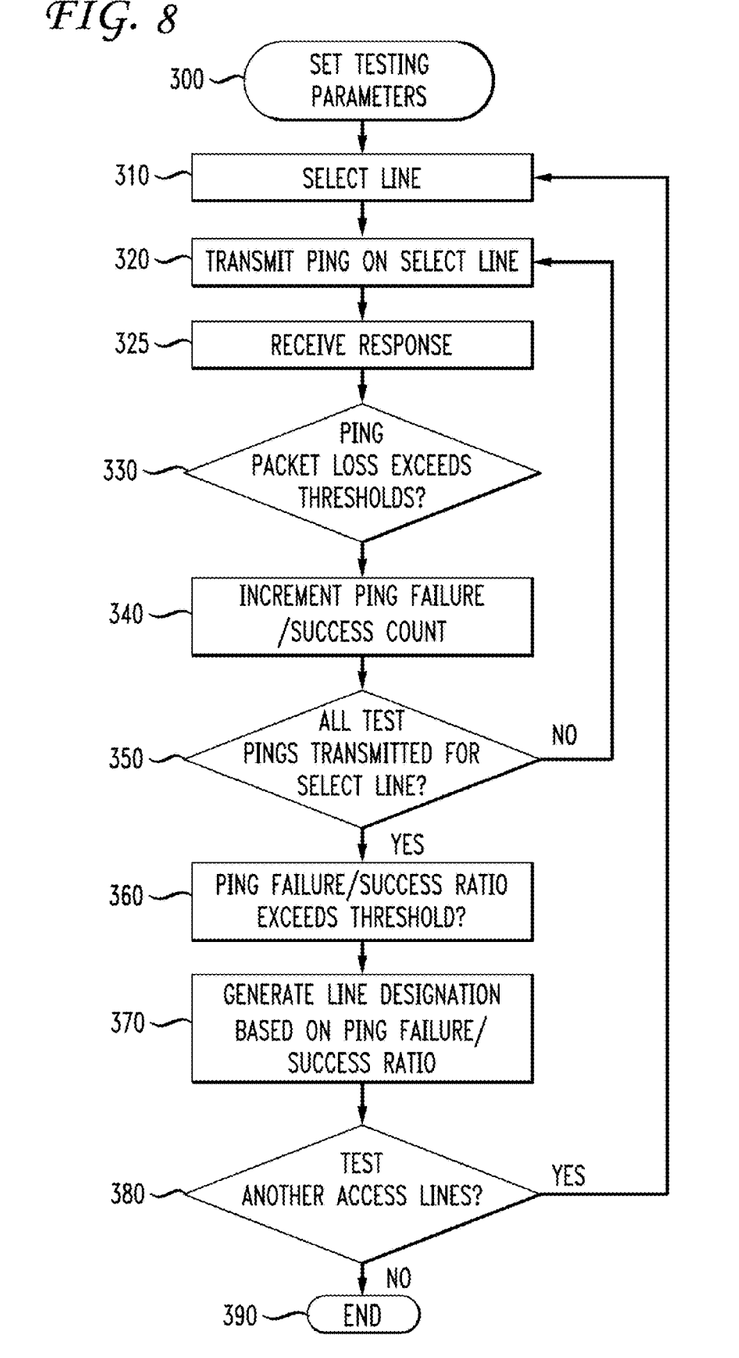
FIG. 8 is a flowchart illustrating a method of identifying access line impairments in a communications network in accordance with a preferred embodiments of the present disclosed technology.

FIG. 8 is a flowchart showing a preferred embodiment of the diagnostics method of the present disclosed technology. The process or operations is/are initiated in 300, where testing parameters such as the total number of pings to be performed for a line test and how the pings will be transmitted on a particular line. Preferably, prior to initiating the process a diagnostic testing period and frequency are selected. The diagnostics are run on an analog access line, with its associated host or customer. Accordingly, in 310 a host line is selected for testing/monitoring. Typically in order to select a line for testing/monitoring a service provider, such as AT&T or Comcast, or a VoIP provider, will test the IP address of each of its network elements in the user's home or place of business. A VoIP provider might choose the IP address of each box (telephone adapter or "TA") supporting its service. Other service providers such as AT&T or Comcast may choose their on premises modem.

Once a line is selected in 310, a ping is transmitted in 320 on that line to a target host/customer. A ping is a network tool used to test whether a particular host is reachable across a network. In an IP network it works by sending Internet Control Message Protocol (ICMP) packets to the target host, also known as echo requests. This in-turn will return ICMP packets from the host, also known as echo responses in 325. Upon receipt of the echo responses in 325, the sender will know or have available the round-trip time for the packets to go to and return from the host. Also, the sender should know how many packets were lost, if any. The number of packets lost in each ping test is referred to as the ping packet loss count. So for example if a ping that transmits 100 packets and only 97 packets are received as part of the echo response, the ping packet loss count (or simply packet loss) is referred to herein as a three percent (3%) level of packet loss. If the packet loss is greater than one percent (1%) it may be noticeable to the host, but not enough to impact the host's service. However, a packet loss of approximately three percent (3%) or greater may not only be noticeable, but may impact service if it occurs frequently. Thus, in 330 it is determined whether the ping packet loss count has exceeded a threshold value, such as three percent (3%). In 340 a tally is kept of the ping tests that exceed the threshold value (failure) and that do not exceed that threshold value (pass). In 350, if all the test pings have noted yet been transmitted for a select line, the process will resume at 320. If all the pings have been transmitted for that line, then in 360 it is determined whether the ping failure count has exceeded its threshold value. The ping failure count represents the total number of pings registered as a failure, for example those pings having packet loss in excess of three percent (3%). Then in 370 a line designation is generated. If the ping failure count is determined to meet or exceed a threshold value, such as ten percent (10%), the select analog access line will be designated as having an impairment or problem that needs to be addressed. This line designation can be used to report a problem line that needs repair or further investigation. Alternatively, if the ping failure count is less than the threshold value the line designation need not report problems for that line. In 380 if no other line needs to be tested, the process ends in 390 if no other lines are ready to be tested. Alternatively, a new line can be selected in 310 for monitoring/diagnostics. The resumption of line testing in 310 can be initiated immediately or after a designated delay period. FIGS. 3-7 illustrate a graphical representation of the type of information that can be compiled during the process described above.

Figure 9:
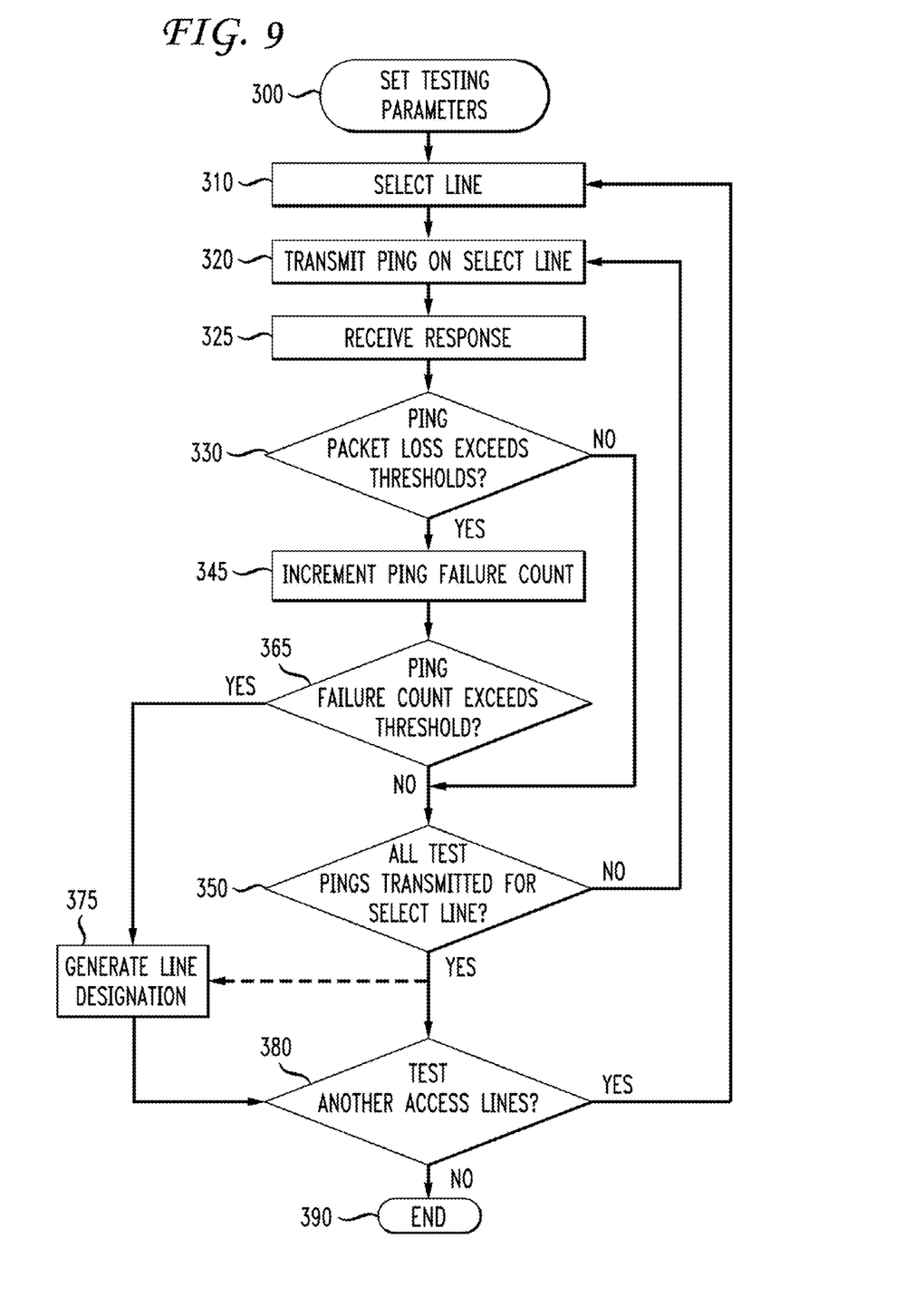
FIG. 9 is a flowchart illustrating an alternative method of identifying access line impairments in a communications network in accordance with a preferred embodiments of the present disclosed technology.

FIG. 9 illustrates an alternative way of generating a line designation. At step 330, if the ping packet loss count has exceeded a threshold value, then in 345 a ping failure count is registered. This ping failure count is incremented during the testing of a select line. If the ping packet loss count did not exceed that threshold, then the process resumes at 350 and further at 320 if all test pings have not been transmitted for that test. In 365 it is determined whether the ping failure count in 345 exceeded a threshold. If so, a line designation is generated to advise of the line condition in 375. If not, then it will proceed at 350. After 350 if all test pings have been transmitted for a particular test, then before moving on to 380 a line designation can be generated in 375 that indicates the line has passed the test. Alternatively, no line designation need be generated for lines that pass.

A determination of an RF problem, as shown in FIGS. 6 and 7, indicates a very unhappy customer. For a cable operator, the usual cause is water-on-the-line (meaning physical fluid in a cable or pipe), and replacing the drop between the pole and the user facility (such as a home or building) usually fixes the problem. Thus, a determination of a threshold condition will generate a line designation that gets a repair team to address the problem. Alternatively, for a cable plant the problem could be caused by amplifiers, which are electrical boxes that are situated in adverse weather conditions, such as heat, cold, rain or snow. Also, plants, animals or even human interaction can damage such equipment. Further, such equipment can even degrade with time on its own and needs to be replaced. Accordingly, the collected, compiled and analyzed data as discussed herein can be used for preventative maintenance. For example, by tracking the growth of "oversold" delay swings, and engineering an upgrade for the backhaul to the Internet.

It is understood that the systems, functions, methods, steps and calculations described herein can be implemented in hardware, software, or a combination of hardware and software. They may be implemented by any type of computer system, processor or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the disclosed technology could be utilized. In a further embodiment, part of all of the disclosed technology could be implemented in a distributed manner, e.g., over a network such as the Internet.

The present disclosed technology can also be embedded in a computer program product or computer-readable storage medium, which comprises all the features enabling the implementation of the methods and functions described herein, and which—when loaded in a computer system or processor—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. The term computer readable storage medium is any data storage device that can store data, which can thereafter be read by a computer system or processor. Examples of the computer readable storage medium include read-only memory, random-access memory, CD-ROMs, DVDs, magnetic tape, optical data storage devices, and carrier waves. The computer readable storage medium can also be distributed over network-coupled processors or computer systems so that the computer readable code is stored and executed in a distributed fashion.

An example of a set of instructions intended to cause a system having information processing capability perform the methods set forth herein includes:

```
# turns last week of ping data into list of fqdn with rf.
# rf for an fqdn == probes with loss>3% are at least 10% of lossless probes.
# 6 200 ping probes per day for last 7 days is 42 probes, total.
# /home/nls/bin/rf.impairment.db holds the 42 file names with the data for testing.
# Typical input record: 71.197.7.0 aa7100011600.b1 xmt/rcv/%loss = 200/200/0.0%,
#    min/avg/max=18.9/21.2/50.8, ndtgt300=0, noo=0
# ip address fqdn header transmitted/received packets delay stats in ms
# /home/nls/bin/rf.impairment.p has the exemplary output of rf.impairment
# example output records:
# aa5302251000.d1 15.2 2.6# fqdn, 15.2% loss/lossless-probes, 2.6% average loss
# aa1909151700.j1 -    # fqdn, no lossless probes
# test: rf.impairment|diff rf.impairment.p -
sh </home/nls/bin/rf.impairment.db|sed -e 's/, ndtgt300=.*$//' | \
awk '{
nl=7 # Loss/probe >=7, out of 200, or > 3% loss
np=10 # Percent of Loss>=7(=nl) probes of lossless probes for rf flag
if ( $0 ~ /xmt.*rcv.[%]loss.*[%][,]/ ) { zfoo=zapzap }
else { next } # Only process complete records.
s=$5; k=split(s,zap,"/"); xmt=zap[1]; rcv=zap[2]; sub("% *$","",rcv)
# Transmitted, received
if ( k!=3 ) { next } # Only process complete records.
n[$2] += 1 # Keep fqdn=$2 records
for ( j=0; j<nl; j+=1 ) { # Count lost by TA and bucket 1...nl
    if ( b[$2,j] == "" ) { b[$2,j] =0 }
    if ( xmt-rcv == j ) { b[$2,j]+=1 }
    }
if ( xmt-rcv >= nl ) { b[$2,nl] +=1 } # nl bucket has all loss >= nl
xmtf[$2]+=xmt; rcvf[$2]+=rcv
}
END { # Count buckets b[fqdn,0...nl] of IDs
# Loss-compared-to-none-percentage
for ( f in n ) { # For each TA fqdn
    s = b[f,nl] # Loss>=nl
    if ( s > np*b[f,0]/100. ) {    # (loss >=nl) more than np % of lossless probe(s)
        if ( b[f,0]>0 ) {          # fqdn %s/b[f,0] %loss if lossless probe(s) recorded
            loss=xmtf[f]-rcvf[f]
            print f" "int(0.5+1000.*s/b[f,0])/10"
"int(0.5+1000.*loss/xmtf[f])/10
        }
        else { print f" -" } # No lossless probe recorded
    }
  }
}'
```

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

The invention claimed is:

1. A method of identifying analog access line impairments in a communications network comprising:
   determining a ping packet loss count and a ping failure count from digital packet loss data associated with at least one analog access line, wherein the ping packet loss count represents a number of packets not returned as part of one of a plurality of ping tests on an analog access line, the ping failure count representing a number of the plurality of ping tests that fail; and
   generating a line designation for the at least one analog access line in response to the ping packet loss count exceeding a first threshold and the ping failure count exceeding a second threshold, wherein the first threshold corresponds to at least a three percent ping packet loss and the second threshold corresponds to at least a ten percent ping failure count.

2. The method of claim 1, further comprising transmitting the plurality of pings during a testing period on the analog access line, the digital packet loss data being generated in response to the plurality of pings.

3. The method of claim 1, wherein the plurality of pings includes at least 200 pings.

4. The method of claim 1, wherein transmitting the plurality of pings is repeated a plurality of times per day.

5. The method of claim 1, wherein transmitting the plurality of pings is repeated at least six times per day.

6. A system for identifying analog access line impairments in a communications network comprising:
   a computing system having one or more computing devices, the computing system configured to:
      determine a ping packet loss count and a ping failure count from digital packet loss data associated with at least one analog access line, wherein the ping packet loss count represents a number of packets not returned as part of one of a plurality of ping tests on an analog access line, the ping failure count representing a number of the plurality of ping tests that fail, and generate a line designation for the at least one analog access line in response to the ping packet loss count exceeding a first threshold and the ping failure count exceeding a second threshold, wherein the first threshold represents at least a three percent ping packet loss, wherein the second threshold represents the ping failure count is at least ten percent of a total number of the plurality of pings during a test period; and
   a modem for coupling the computing system to at least one analog access line for identification of impairments.

7. The system of claim 6, wherein the computing system is configured to transmit the plurality of pings during a testing period on the analog access line, the digital packet loss data being generated in response to the plurality of pings.

8. The system of claim 6, wherein the plurality of pings includes at least 200 pings.

9. The system of claim 6, wherein transmitting the plurality of pings is repeated a plurality of times per day.

10. The system of claim 6, wherein the transmitting the plurality of pings is repeated at least six times per day.

11. A non-transitory computer-readable storage medium storing instructions that, when executed by a processor, cause the processor to identify analog access line impairments in a communications network by:

determining a ping packet loss count and a ping failure count from digital packet loss data associated with at least one analog access line, wherein the ping packet loss count represents a number of packets not returned as part of one of a plurality of ping tests on an analog access line, the ping failure count representing a number of the plurality of ping tests that fail; and     generating a line designation for the at least one analog access line in response to the ping packet loss count exceeding a first threshold and the ping failure count exceeding a second threshold, wherein the first threshold represents at least a three percent ping packet loss, wherein the second threshold represents the ping failure count is at least ten percent of a total number of the plurality of pings during a test period.

12. The non-transitory computer-readable storage medium of claim 11, wherein execution of the instructions transmits a plurality of pings during a testing period on the analog access line, the digital packet loss data being generated in response to the plurality of pings.

13. The non-transitory computer-readable storage medium of claim 11, wherein the plurality of pings includes at least 200 pings.

14. The non-transitory computer-readable storage medium of claim 11, wherein transmitting the plurality of pings is repeated no more than six times per day.

\* \* \* \* \*